(12) United States Patent
Wefers et al.

(10) Patent No.: US 9,205,639 B2
(45) Date of Patent: Dec. 8, 2015

(54) METHOD FOR PRODUCING PERFORATED OR PARTIALLY PERFORATED STENCILS WITH A RELIEF

(71) Applicant: SPGPrints Austria GmbH, Langkampfen (AT)

(72) Inventors: Lothar Wefers, Oberaudorf (DE); Josef Juffinger, Thiersee (AT)

(73) Assignee: SPGPRINTS AUSTRIA GMBH, Langkampfen (AT)

( * ) Notice: Subject to any disclaimer, the term of this patent is extended or adjusted under 35 U.S.C. 154(b) by 0 days.

(21) Appl. No.: 14/524,907

(22) Filed: Oct. 27, 2014

(65) Prior Publication Data

US 2015/0040781 A1    Feb. 12, 2015

Related U.S. Application Data

(60) Division of application No. 12/917,096, filed on Nov. 1, 2010, now abandoned, which is a continuation of application No. PCT/EP2009/007608, filed on Oct. 23, 2009.

(51) Int. Cl.
*B41N 1/24* (2006.01)
*B41C 1/14* (2006.01)
*B41F 15/34* (2006.01)
*B23K 26/38* (2014.01)

(52) U.S. Cl.
CPC ............... *B41F 15/34* (2013.01); *B23K 26/38* (2013.01); *B41C 1/145* (2013.01); *B41N 1/24* (2013.01); *B41C 1/142* (2013.01); *B41N 1/247* (2013.01)

(58) Field of Classification Search
CPC .......... B41C 1/145; B41N 1/24; B41N 1/247; B23K 26/38; B41F 15/34; G03F 7/12

USPC .......................................... 101/128.21, 128.4
See application file for complete search history.

(56) References Cited

U.S. PATENT DOCUMENTS

| | | | |
|---|---|---|---|
| 3,696,742 A | 10/1972 | Parts et al. | |
| 3,934,503 A | 1/1976 | Kinney et al. | |
| 4,118,288 A | 10/1978 | Rückl | |
| 5,460,316 A | 10/1995 | Hefele | |
| 6,309,799 B1 | 10/2001 | Ruckl | |
| 2007/0089621 A1 | 4/2007 | Kimball et al. | |
| 2008/0028581 A1 | 2/2008 | Ronzani | |
| 2008/0193790 A1 | 8/2008 | Leroy | |

(Continued)

FOREIGN PATENT DOCUMENTS

| DE | 10 2005 023 533 A1 | 11/2006 |
|---|---|---|
| DE | 10 2007 059 794 A1 | 6/2009 |

(Continued)

*Primary Examiner* — Leslie J Evanisko
(74) *Attorney, Agent, or Firm* — Muncy, Geissler, Olds & Lowe, P.C.

(57) ABSTRACT

A method is provided for producing a stencil having a relief with multiple openings on its upper side. The contours correspond to a desired pattern and to a stencil of this type. The stencil has a body with at least one non-perforated non-metal relief layer, which allows greater relief heights and increased freedom of design. The relief layer is removed according to the pattern by laser or plasma radiation to form the multiple openings. Through-openings extending to a rear side opposite the upper side are provided at least in the bottom region of the openings of the relief. A stencil with a stencil body may be obtained, having at least one non-metal relief layer, formed in the upper side of which is a relief with multiple openings, the contours of which correspond to a desired pattern. Through-openings extending to a rear side opposite from the upper side are provided.

9 Claims, 5 Drawing Sheets

(56) References Cited

U.S. PATENT DOCUMENTS

2009/0282993 A1 11/2009 Bass et al.
2014/0305323 A1* 10/2014 Koenen .................. 101/127

FOREIGN PATENT DOCUMENTS

| | | | |
|---|---|---|---|
| EP | 0 913 730 | A1 | 5/1999 |
| EP | 1 884 582 | A1 | 2/2008 |
| EP | 1 884 582 | B1 | 9/2009 |
| JP | H03-57697 | A | 3/1991 |
| JP | H03-72364 | A | 3/1991 |
| JP | H03-92390 | A | 4/1991 |
| JP | H05-309965 | A | 11/1993 |
| JP | 2004-276384 | A | 10/2004 |
| JP | 2010260307 | A * | 11/2010 |
| NL | 1012100 | | 11/2000 |

\* cited by examiner

METHOD FOR PRODUCING PERFORATED OR PARTIALLY PERFORATED STENCILS WITH A RELIEF

CROSS REFERENCE TO RELATED APPLICATIONS

This application is a Divisional of application Ser. No. 12/917,096, filed on Nov. 1, 2010, now abandoned, which is a Continuation of International Application No. PCT/EP2009/007608, filed on Oct. 23, 2009, and for which priority is claimed under 35 U.S.C. §120, the entire contents of all of which are hereby incorporated by reference.

BACKGROUND OF THE INVENTION

1. Field of the Invention

The invention relates to a method for producing perforated or partially perforated stencils which have on their upper side a relief with a multiplicity of openings, the contours of which correspond to a desired pattern, and relates to stencils of this type.

2. Brief Discussion of the Related Art

EP 1 884 582 B1 already discloses a method for producing a stencil or a screen in which a screen body is first provided, having a multiplicity of through-openings which extend from the upper side to the rear side. In order to form a relief in the upper side, lower-lying regions or openings are removed by a chemical process by etching or by means of laser radiation in accordance with a desired pattern. The screen body that is provided with a multiplicity of through-openings may in principle consist here of non-metallic materials, such as for example plastic, ceramic, natural resin or lacquer materials that are suitable for forming stable sheet-like elements, composite materials or a combination thereof, but only the production of screen bodies made of metal, such as nickel, copper or aluminum, or alloys thereof, is described in detail here.

US 2008/0193790 A1 discloses a screen drum which serves for producing nonwovens by means of a liquid jet bonding process. The screen drum has here on its upper side, to which the fibrous material is applied, lower-lying regions or openings, the contours of which correspond to a desired pattern. The screen drum is galvanically produced in two phases. In a first phase, a carrier screen with a multiplicity of through-openings is created. After achieving the desired thickness, then, in a second phase, the thickness of the screen drum is further increased only where raised regions are intended, so that lower-lying regions or openings of a relief occur. The walls of the openings of the relief are slightly inclined outwardly.

DE 10 2007 059 794 A1 discloses a method for producing a screen printing stencil in which recesses are machined out of a metallic carrier substrate from the later scraper side, in order to create a carrier network. On the later substrate side, the structure to be printed is then machined in the form of further recesses, so that openings for the pasty screening material form at the places at which the fronts of the recesses on both sides meet in the stencil body. The production of the stencil is performed here by micro-etching or laser ablation.

However, production methods of this type only permit limited relief heights. In the case of galvanic stencils, it is also disadvantageous that the through-openings become increasingly narrow with increasing thickness, which further restricts relief heights.

Against this background, the invention is based on the object of providing a further method for producing stencils and improved stencils that permits greater relief heights and consequently greater freedom of design for patterns to be applied.

SUMMARY OF THE INVENTION

According to the invention, therefore, a stencil is produced by removing material to form the relief by means of laser or plasma radiation from a stencil body which has a relief layer of non-metallic material. Through-openings are provided here at least in the region of the bottom of the openings of the relief.

Depending on the application and the thickness of the relief layer, direct removal of material from the relief layer allows relief depths of up to several millimeters to be readily achieved. The use of laser or plasma radiation, in particular of laser or plasma radiation of a high energy density, provides a great freedom of design for stencils with patterns for a wide variety of applications. In particular, the freedom of design for creating desired patterns is improved by the fact that the use of radiation for structuring the stencils allows a wide variety of materials to be provided for the stencils.

According to the invention, therefore, a stencil body which has at least one non-metal relief layer, particularly a non-perforated layer, is provided, and the material of the relief layer is subsequently removed according to the pattern by means of laser or plasma radiation to form the multiplicity of openings of the relief, through-openings which extend to a rear side opposite from the upper side being provided at least in the bottom region of the openings of the relief.

If the stencil body has no carrier layer or a non-perforated metal or non-metal carrier layer on the rear side of the relief layer, through-openings are introduced into the stencil body, at least in the bottom region of the openings of the relief, by means of laser radiation.

If, on the other hand, the stencil body has a perforated carrier layer, particularly a metal screen, on the rear side of the relief layer, through-openings are formed, at least in the bottom region of the openings of the relief, by at least partial exposure of the openings in the carrier layer by means of laser or plasma radiation, in particular the through-openings in the bottom region of the openings of the relief may be exposed by completely removing the relief layer.

The forming or exposing of the through-openings by means of suitable laser or plasma radiation has the advantage that the entire processing of the stencil body can be carried out in one or more steps in one and the same processing station.

Furthermore, if so required, as for example in the case of water jet bonding of wovens or nonwovens, it is possible that non-pattern-forming openings or perforations are introduced into the relief layer in a plateau region outside the openings of the relief by means of laser radiation, these non-pattern-forming openings being congruent with the openings of the carrier layer to form through-openings. However, it is also possible to form the non-pattern-forming openings or perforations in such a way that they differ in shape, size and/or arrangement from the openings of the carrier layer. In this way, the permeability of the stencil can be differently formed in different stencils or regions of the pattern, in order in this way to assist the pattern formation.

The possibilities for variation within patterns is further increased if material of the relief layer is also removed by means of laser radiation outside the openings, so that plateau regions outside the openings of the relief have different heights; as in the case where the plateau heights are the same, here, too, the walls of the openings may be inclined, beveled, rounded or graduated in the form of steps with respect to the surrounding plateau region when forming the openings, which expediently takes place by modulation of the radiation power density.

Furthermore, the surface of the plateau regions outside the openings may be provided with a regular, random or pseudo-random microstructure.

In addition, the surface of the plateau regions or the entire exposed surface of the relief layer may be provided with a coating, which preferably consists of metal or suitable Teflons, in order to adapt the surface properties to a desired intended use. Coatings of this type may be applied in various ways, in particular chemically, galvanically or by spraying or printing techniques.

A stencil according to the invention therefore has at least one non-metal relief layer, in the upper side of which a relief is formed with a multiplicity of openings, the contours of which correspond to a desired pattern, through-openings which extend to a rear side opposite from the upper side being provided at least in the bottom region of the openings of the relief.

The stencil body expediently has on the rear side of the relief layer a non-perforated metal or non-metal carrier layer, which is provided with through-openings at least in the bottom region of the openings of the relief.

The carrier layer may particularly consist here of glass- or carbon-fiber reinforced metal or non-metal.

A perforated carrier layer, for example a metal screen, may also be provided, the through-openings of which are at least partially exposed in the bottom region of the openings of the relief.

If the relief layer has non-pattern-forming through-openings or perforations that are introduced by means of laser radiation in a plateau region outside the openings of the relief, it is expedient if they are congruent with the openings of the carrier layer.

However, it is also possible that the non-pattern-forming through-openings or perforations differ in shape, size and/or arrangement from the openings of the carrier layer.

A development of the invention is distinguished by the fact that the metal screen is produced galvanically.

If, instead of a galvanic metal screen, a metal screen of wire gauze is used, it is advantageous if it is provided with a galvanic surface coating. However, it is also conceivable to use a screen made of stainless steel. In the case of a surface coating, however, the metal screen is particularly stable, which is advantageous under compressive loading.

In order to further increase the possibilities for designing the patterns, it is provided in the case of an expedient refinement of the invention that plateau regions outside the openings of the relief have different heights, it being possible, as in the case of stencils with patterns of uniform plateau height, for the walls of the openings to be inclined, beveled, rounded or graduated in the form of steps with respect to the surrounding plateau region.

In order to adapt the surface properties of the stencil to the respective intended use, it is provided that the surface of the plateau regions outside the openings is provided with a regular, random or pseudo-random microstructure, and/or that the surface of the plateau regions or the entire exposed surface of the relief layer is provided with a coating.

BRIEF DESCRIPTION OF THE DRAWINGS

The invention is explained in more detail below on the basis of exemplary embodiments that are represented in the drawing, in which.

Figure 1:
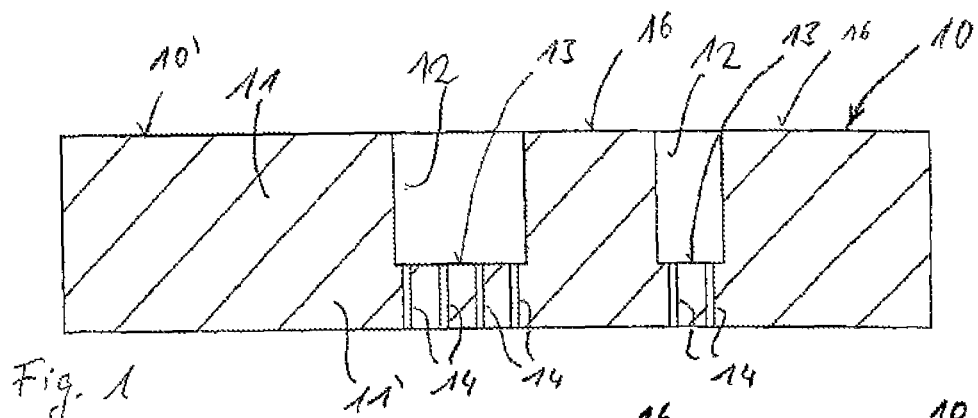
FIG. 1 shows a schematic section through a stencil according to the invention which is perforated only in the bottom region of openings of a relief.

In the various figures of the drawing, elements that correspond to one another are provided with the same designations.

DETAILED DESCRIPTION OF THE PREFERRED EMBODIMENTS

As shown in FIG. 1, a stencil according to the invention, which is formed as a partially perforated plate or as a cylinder, has a stencil body 10, which may be formed as a plate or cylinder and has a relief layer 11, formed in which are clearances or openings 12, the contours of which correspond to a desired pattern. Provided in the bottom region 13 of the openings 12 is a carrier layer portion 11' of the stencil body 10 with perforations or through-openings 14, which, depending on the application area of the stencil, allow air or liquid to pass through.

A main application area of the stencil according to the invention is the liquid jet bonding of fibrous fleeces in the production of nonwovens that are provided with patterns in the form of a relief. The openings 12 or recesses in the stencil body correspond here to the pattern to be impressed onto the nonwoven.

The stencil according to the invention can, however, also be used in scatter printing, where the stencil is then formed as a cylinder, to the inside of which a vacuum is applied. The openings 12 can then be filled with bulk material, that is to say with granules or small pellets, which are held in the openings 12 by the vacuum applied to the inside of the cylindrical stencil. With the aid of a sheet lying on the inside, the through-openings 14 can then be separated from the vacuum wherever the bulk material is intended to be discharged onto a substrate to be printed onto by the scatter printing process.

The stencil according to the invention can also be used as a printing plate or impression cylinder in screen printing, in particular wherever large amounts are to be applied to absorbent substrates, such as for example fabrics or carpets. Here, the printing ink is forced through the through-openings 14 in the bottom region 13 of the openings 12 into the latter and then transferred out of them onto the substrate.

Figure 2:
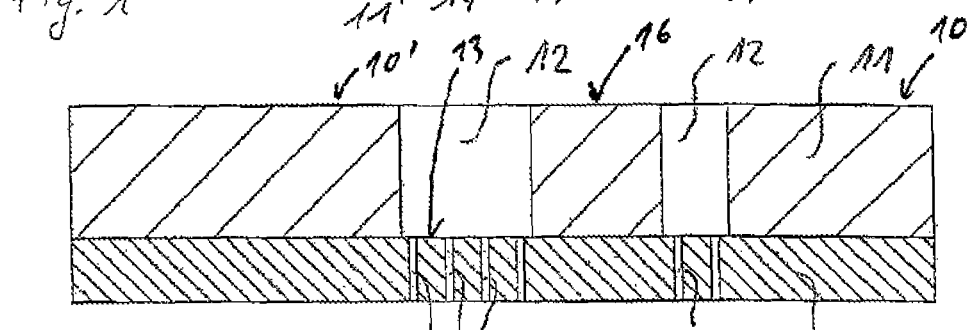
FIG. 2 shows a schematic section through a stencil according to the invention in which a relief layer that is only perforated, that is to say provided with through-openings, in the bottom region of the openings of the relief is formed on a carrier layer.
Figure 4:
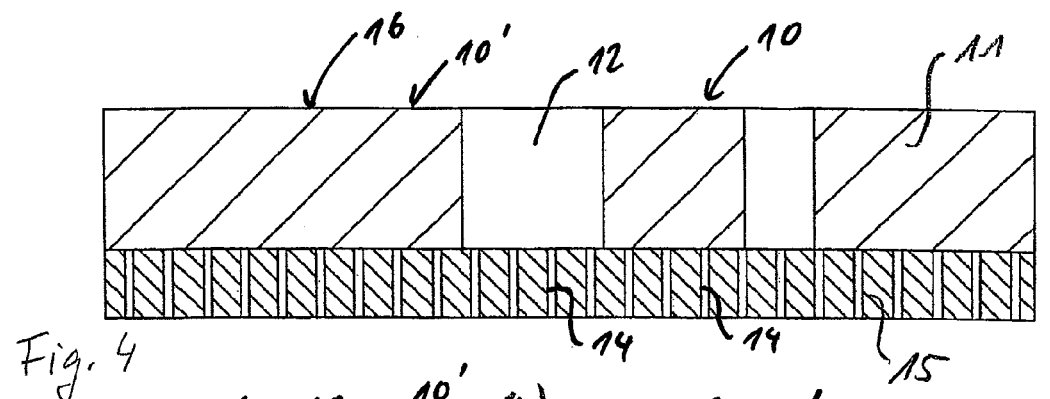
FIG. 4 shows a schematic section through a stencil according to the invention, similar to FIG. 2, in which the carrier layer is formed as a screen and is perforated over its entire surface area.

In order to obtain protection here from wear caused by scraping forces, it is expedient if, as shown in FIG. 2, the stencil body 10 has a separate carrier layer 15, which preferably consists of metal and, as also shown in FIG. 4, is particularly formed as a metal screen. Furthermore, the perforating and embossing of foils with a cylindrical stencil is possible if the latter has a relief and a surface of an appropriate form, as can be produced according to the invention in a simple way.

To produce a stencil according to the invention, firstly a stencil body 10 is provided, formed as a plate or cylinder. The stencil body 10 consists here either of a continuous relief layer 11 with a carrier layer portion 11' remote from its upper side 10' or of a composite material in which the relief layer 11 is arranged on a carrier layer 15.

The relief layer consists of a non-metal, for example of a synthetic or natural polymer, rubber, hard rubber or other vulcanized materials, ceramic or suitable silicones. Particularly suitable for the carrier layer 15 are metals, but also glass- or carbon-fiber reinforced plastics. Apart from non-perforated metal layers, particularly suitable as the carrier layer 15 are metal screens made of nickel, copper or other metals, which can be galvanically produced, or which are formed as wire gauze. In the case of composite materials of this type, the non-metallic relief layer is materially bonded to the metallic carrier layer 15, in order to obtain the stencil body 10 formed as a laminate.

If radiation is used, particularly laser or plasma radiation, material of the relief layer is then removed in order to form the desired relief with the openings 12 and the plateau regions 16 lying outside the openings 12. After forming the relief or when forming the relief, the through-openings 14 are then produced in the bottom region 13 of the openings 12 in the carrier layer portion 11' or the carrier layer 15 (cf. FIG. 2), likewise by corresponding removal of material.

If, as shown in FIG. 4, a screen is used as the carrier layer 15, the through-openings 14 are formed by the screen openings. In this case, it is merely necessary to expose the corresponding screen openings.

Figure 5:
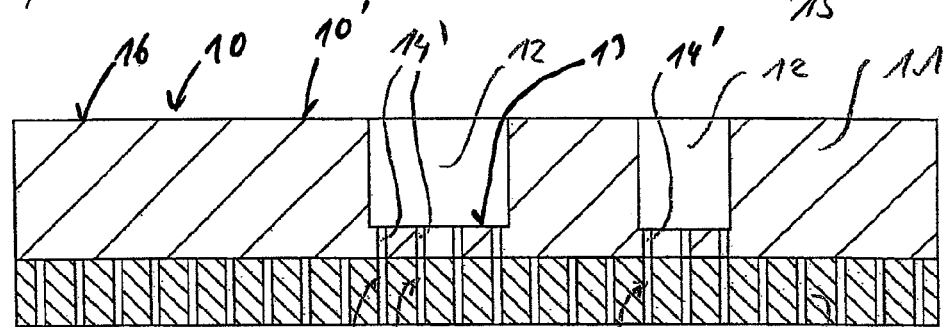
FIG. 5 shows a schematic section through a stencil according to the invention, similar to FIG. 4, in which parts of the relief layer in the bottom region of openings of the relief have been left.

If, as shown in FIG. 5, in spite of the use of a carrier layer 15, material of the relief layer 11 is left in the bottom region 13 of the openings 12, in order for example in the case of narrow plateau regions 16 to obtain better stability and adhesive attachment of the relief layer 11 in the region of the small plateaus, the corresponding screen openings are formed by forming through-openings 14' in the relief layer, in order to obtain the through-openings 14.

If, when using a screen of wire gauze, the relief layer is exposed in the region of the openings, it is expedient if the wire gauze is galvanically coated, in order in each case to smooth the screen in the crossing region of the wires.

Figure 6:
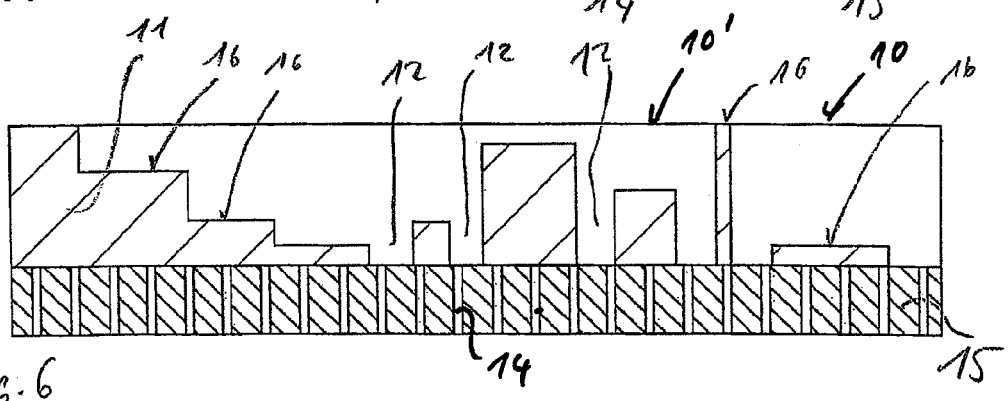
FIG. 6 shows a schematic section through a stencil according to the invention, similar to FIG. 4, in which plateau regions outside the openings have different heights.

As shown in FIG. 6, reliefs for any desired patterns can be produced from the relief layer 11, in particular plateau regions 16 of the relief layer 11 outside the openings 12 may be provided with different heights. The plateau regions 16 of different heights may be obtained here, for example, by the material removal taking place in a number of steps one after the other, or by the energy density for the material removal being chosen to be greater or smaller by modulation of the power of the laser or plasma, depending on whether openings or plateaus of small height or great height are to be formed.

Figure 8:
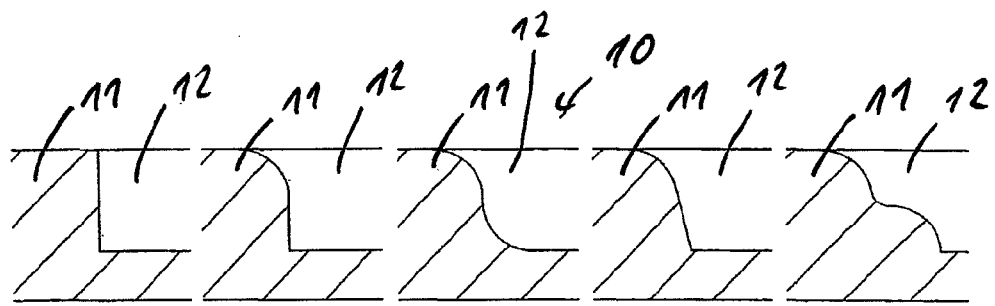
FIG. 8 shows various schematic sections in the region of the edges of the openings of the relief.

As shown in FIG. 8, modulation of the radiation power also allows rounded and/or inclined and/or stepped edge transitions to be produced between the plateaus and the openings. In order to produce sharp edges (right-angled edges), the power is switched from 0 directly to the desired level. In the case of rounded edges, the power is varied in accordance with the desired form of the edges, dependent on the advancement of the radiation beam.

Figure 7:
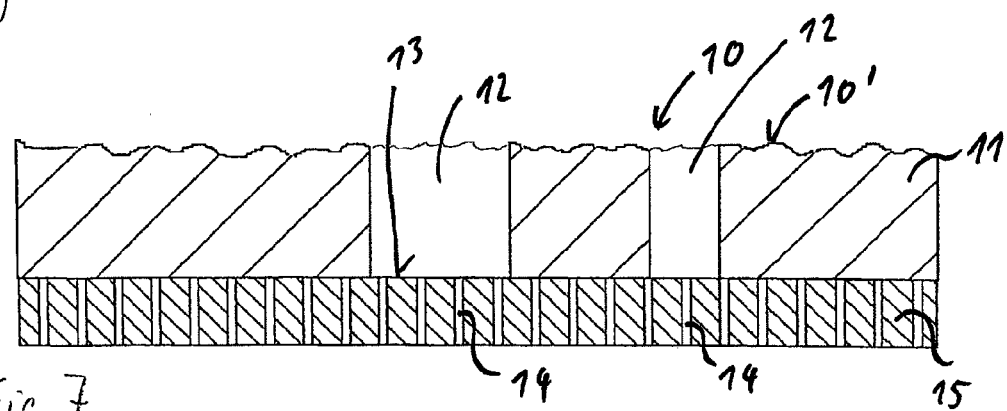
FIG. 7 shows a schematic section through a stencil according to the invention, similar to FIG. 4, in which the surface of the plateau regions outside the openings of the relief is structured.

Depending on the application, the upper side 10' of the stencil body 10 may also be provided with an additional surface structure, as is shown in FIG. 7. The surface structure may be formed here either by suitable processes during the production of the relief layer 11, or it may be created during the removal of material to form the relief by means of laser or plasma radiation. While FIG. 7 shows a microstructure which is formed randomly in terms of height and lateral size, regular microstructures may also be provided, as are used in particular for the embossing and perforating of foils.

Figure 9:
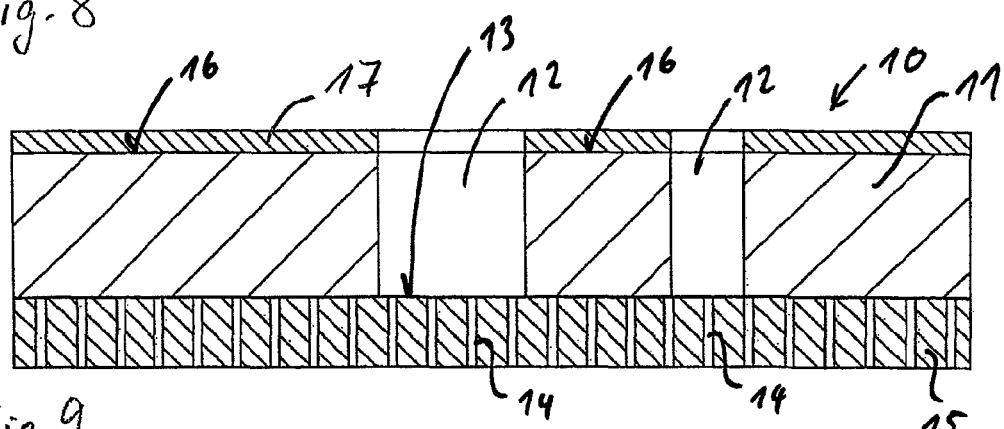
FIG. 9 shows a schematic section through a stencil according to the invention, similar to FIG. 4, in which the surface of the plateaus is coated.
Figure 10:
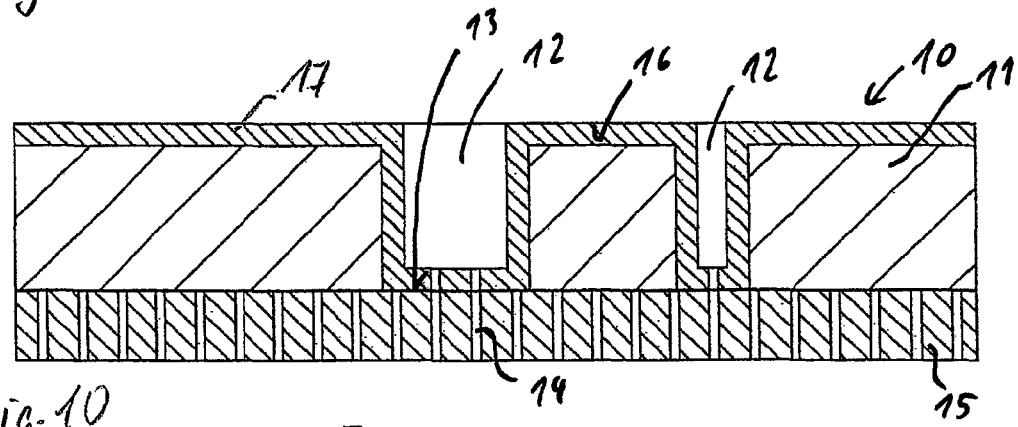
FIG. 10 shows a schematic section through a stencil according to the invention, similar to FIG. 4 or 9, in which the entire surface of the relief is coated.
Figure 11:
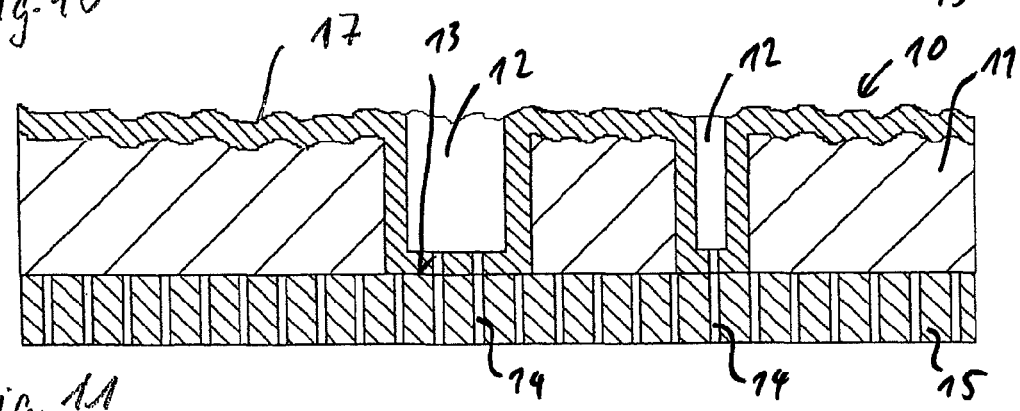
FIG. 11 shows a schematic section through a stencil according to the invention, similar to FIG. 7, in which the entire surface of the relief is coated.

As shown in FIGS. 9 to 10, the upper side of the relief layer 11, that is just the plateau regions thereof or the entire exposed surface of the relief layer 11, and possibly the carrier layer 15, may be provided with a coating 17. The coating 17 may be a metallization which has been applied chemically, galvanically or by a spraying technique. If the coating 17 is only desired on the upper side of the plateau regions 16, as shown in FIG. 9, it can also be applied by a printing technique.

If the coating 17 is also provided in the bottom region 13, exposure of the through-opening 14 in the carrier layer 15 is subsequently necessary. If, in a way similar to in FIG. 1 or 2, a non-perforated carrier layer portion 11' or non-perforated carrier layer 15 is provided, the through-openings 14 should be produced after the forming of the coating 17.

Figure 3:
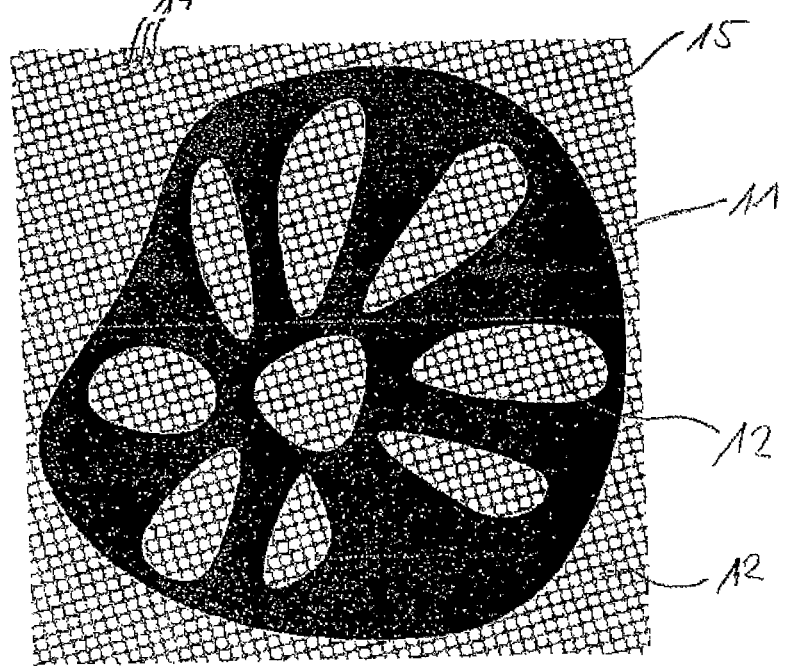
FIG. 3 shows a schematic plan view of a stencil according to the invention, as shown in FIG. 1 or 2.

The previously described exemplary embodiments concern stencils in which the plateau regions 16 outside the openings 12 have no perforations or through-openings, as shown in the plan view of FIG. 3.

Figure 12:
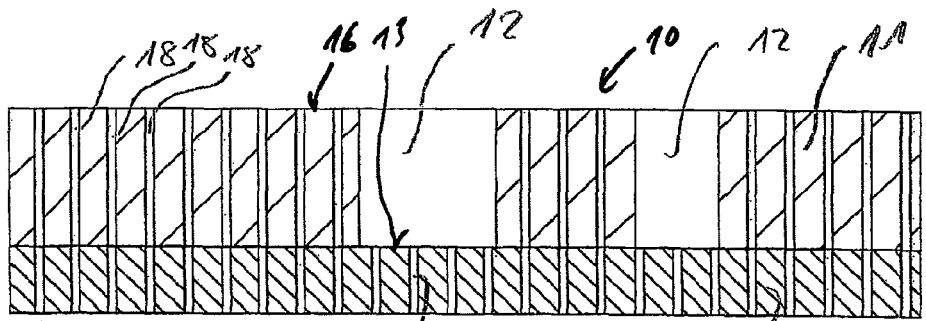
FIG. 12 shows a schematic section through a stencil according to the invention, similar to FIG. 4, in which through-holes or perforations are formed in the plateau region and are in line with the through-openings or perforations of the carrier layer.
Figure 13:
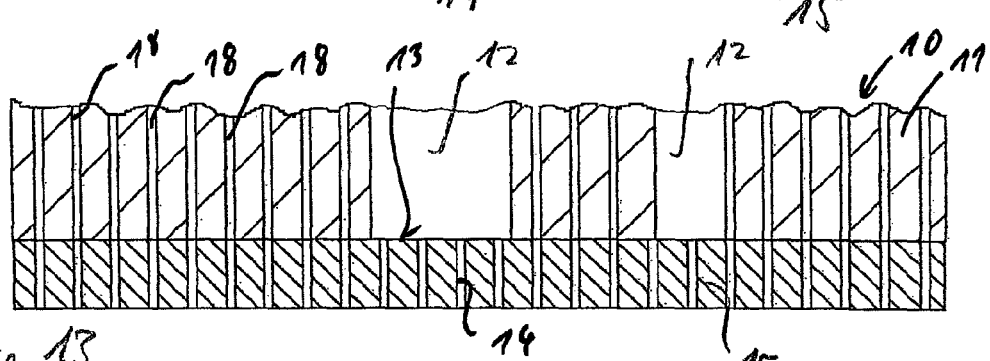
FIG. 13 shows a schematic section through a stencil according to the invention, similar to FIG. 12, in which the surface of the plateaus is structured.
Figure 14:
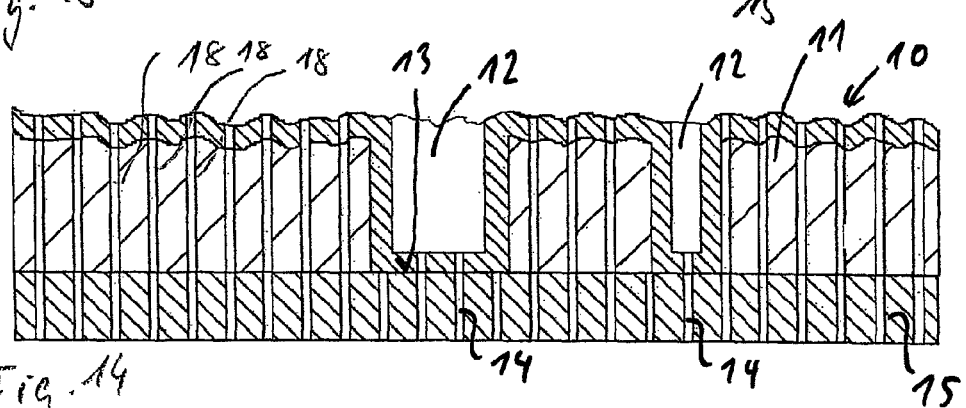
FIG. 14 shows a schematic section through a stencil according to the invention, similar to FIG. 13, in which the entire surface of the relief is coated.
Figure 15:
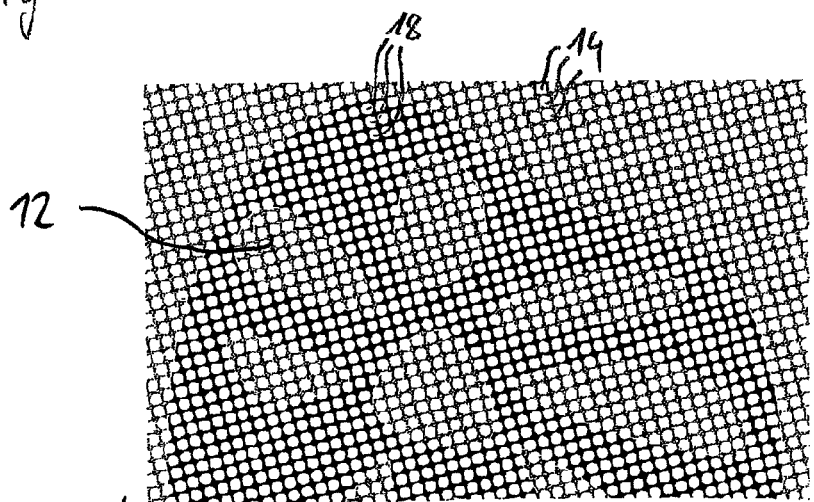
FIG. 15 shows a schematic plan view of a stencil according to the invention, as shown in FIGS. 12 to 14.
Figure 16:
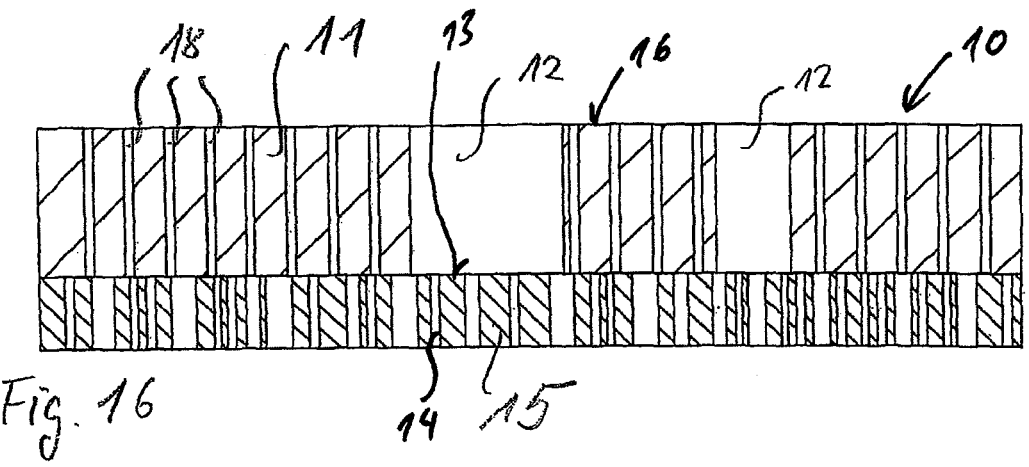
FIG. 16 shows a schematic section through a stencil according to the invention, similar to FIG. 12, in which however the perforations or through-holes in the relief layer differ in shape, size and/or arrangement from the through-openings or perforations of the carrier layer.

However, it is also possible, depending on the application and the lateral size of the plateau regions, likewise to provide the latter with perforations or through-openings 18, as is shown in FIGS. 12 to 15. In the case of the exemplary embodiments as shown in FIG. 12 or 13, the perforations or through-openings 18 may be produced here at the same time as the openings 12 or in separate operations. In the case of the stencil shown in FIG. 14 with a coating 17 on the surface, however, the perforations or through-openings 18 must be formed in a separate method step after the application of the coating.

As shown in FIGS. 12 to 15, the through-openings 18 in the relief layer 11 are aligned with the openings in the screen-like carrier layer 15. In production, the relief layer 11 may be already provided in the perforated state and be formed with the screen-like carrier layer 15 in such a way that the through-openings 18 in the relief layer 11 and the carrier layer 15 are aligned with one another. However, it is also possible first to connect a non-perforated relief layer 11 and carrier layer 15 to each other and then create the through-openings 18, which extend through both layers. This is possible, for example, by means of laser radiation, plasma radiation, a water jet or mechanically, particularly by drilling.

However, it is also possible that the density (number per surface area), distribution, and lateral size of the perforations or through-openings 18 in the pattern or plateau regions 16 of the relief layer 11 and/or of the openings in the carrier layer are different from one another, as long as some of the openings in the relief layer 11 and in the carrier layer 15 in each case have regions of overlap with one another.

Figure 17:
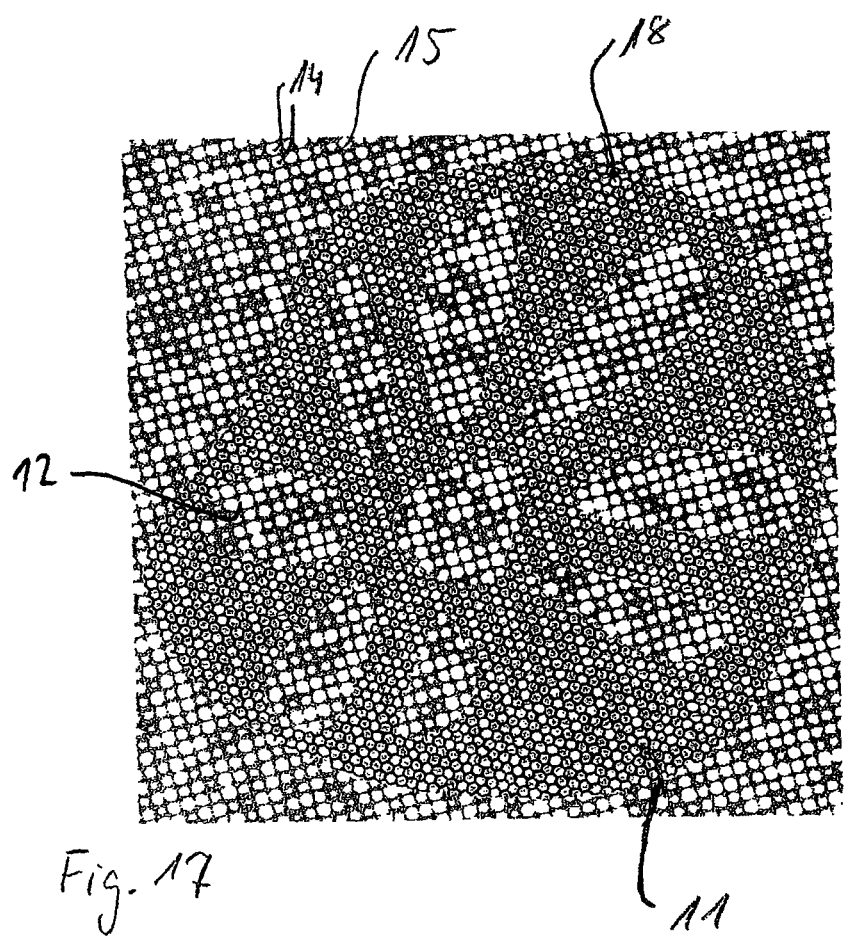
FIG. 17 shows a schematic plan view of a pattern region of a stencil according to the invention, as shown in FIG. 16.

For example, FIG. 17 shows in the carrier layer 15 a matrix-like arrangement of openings 12 of different lateral sizes, while the through-openings 18 in the relief layer 11 are arranged in the form of a honeycomb.

The use of laser or plasma radiation with a high energy density allows any desired pattern-like reliefs and perforations or through-openings to be formed according to the invention in non-metallic portions of basic stencil bodies, as are required, for example, in the case of water jet bonding of nonwovens. The invention allows in particular large relief depths in the range of 2 or 3 or more millimeters, which cannot be achieved with conventional techniques.

Plasma radiation is used here for coarser structures, while fine and ultrafine structures, in particular cleanly formed embossed edges, can be produced with desired shaping by means of laser radiation. Particularly when forming fine and ultrafine structures, it is expedient here if the surface of the stencils is coated, that is metallized or provided with Teflons or the like, in order to obtain specific surface finishes and/or to protect the surface from wear.

The invention claimed is:

1. A method for producing a stencil, which has an upper side with a relief including a multiplicity of openings, wherein a plurality of contours of the stencil correspond to a desired pattern, with the following steps:

(a) providing a stencil body, which has a non-metal relief layer, and, on a rear side of the relief layer, as a perforated carrier layer, a metal screen, and (b) removing a material of the relief layer according to the desired pattern by means of laser or plasma radiation to form the multiplicity of openings in the relief layer, wherein through-openings in the carrier layer are provided at least in a bottom region of the openings in the relief layer, the through-openings extending to a rear side opposite from the upper side, and being formed by at least partial exposure of the openings in the carrier layer by means of laser or plasma radiation.

2. The method as claimed in claim 1, wherein the through-openings in the bottom region of the openings in the relief layer are exposed by completely removing the relief layer.

3. The method as claimed in claim 1, further comprising: introducing non-pattern-forming openings or perforations into the relief layer in a plateau region outside the openings in the relief layer by means of laser radiation, the non-pattern-forming openings being congruent with the openings in the carrier layer or differing in shape, size and/or arrangement from the openings in the carrier layer, to form the through-openings.

4. The method as claimed in claim 3, wherein the walls of the openings are inclined, beveled, rounded or graduated in the form of steps with respect to the surrounding plateau region when forming the openings.

5. The method as claimed in claim 4, wherein transitions between the openings and the plateau regions of the relief layer are inclined, beveled, rounded or graduated in the form of steps by modulation of radiation power density of the laser or plasma radiation.

6. The method as claimed in claim 3, wherein the surface of the plateau regions or the entire exposed surface of the relief layer is provided with a coating.

7. The method as claimed in claim 6, wherein the coating consists of metal, which is applied chemically, galvanically or by spraying or printing techniques.

8. The method as claimed in claim 1, further comprising: removing the material of the relief layer by means of laser radiation outside the openings, so that a plurality of plateau regions outside the openings in the relief have different heights.

9. The method as claimed in claim 8, wherein the surface of the plateau regions outside the openings are provided with a regular, random or pseudo-random microstructure.

* * * * *